US012322900B2

(12) United States Patent
Becavin

(10) Patent No.: US 12,322,900 B2
(45) Date of Patent: Jun. 3, 2025

(54) CONNECTOR PROVIDED WITH A CAP FOR LOCKING TO A COMPLEMENTARY CONNECTOR AND WITH ONE OR MORE MEANS FOR SECURING THE LOCKING AND THE ASSOCIATED COUPLING BETWEEN CONNECTORS

(71) Applicant: RADIALL, Aubervilliers (FR)

(72) Inventor: Patrice Becavin, Auzouer en Touraine (FR)

(73) Assignee: RADIALL, Aubrevilliers (FR)

( * ) Notice: Subject to any disclaimer, the term of this patent is extended or adjusted under 35 U.S.C. 154(b) by 362 days.

(21) Appl. No.: 18/167,977

(22) Filed: Feb. 13, 2023

(65) Prior Publication Data

US 2023/0261420 A1 Aug. 17, 2023

(30) Foreign Application Priority Data

Feb. 14, 2022 (FR) ..................................... 22 01274

(51) Int. Cl.

*H01R 13/639* (2006.01)
*H01R 13/629* (2006.01)
*H01R 13/641* (2006.01)

(52) U.S. Cl.

CPC . *H01R 13/62911* (2013.01); *H01R 13/62927* (2013.01); *H01R 13/641* (2013.01)

(58) Field of Classification Search

None

See application file for complete search history.

(56) References Cited

U.S. PATENT DOCUMENTS

| | | | |
|---|---|---|---|
| 7,329,138 B2 | 2/2008 | Van Der Mee et al. |
| 8,651,883 B2 | 2/2014 | Becavin et al. |
| 8,888,517 B2 | 11/2014 | Becavin et al. |
| 11,509,096 B2 | 11/2022 | Mougin et al. |
| 2003/0109155 A1 | 6/2003 | Yamashita |
| 2006/0223371 A1 | 10/2006 | Van Der Mee et al. |

FOREIGN PATENT DOCUMENTS

| | | |
|---|---|---|
| EP | 1 708 313 B1 | 3/2011 |
| EP | 2 503 651 B1 | 5/2013 |
| EP | 2 654 137 A1 | 10/2013 |
| EP | 3 427 348 A1 | 1/2019 |
| EP | 3 879 639 A1 | 9/2021 |
| WO | 2017/153542 A1 | 9/2017 |

OTHER PUBLICATIONS

French Search Report for corresponding French Application No. 2201274 dated Sep. 22, 2022.

*Primary Examiner* — Ross N Gushi
(74) *Attorney, Agent, or Firm* — Chrisman Gallo Tochtrop LLC

(57) ABSTRACT

Connector provided with a cap for locking to a complementary connector and with one or more means for securing the locking and the associated coupling between connectors. The application includes a means that makes it possible to secure, preferably by mechanical interference, the fact that the locking cap effectively locks the casing of the connector to that of a complementary connector.

14 Claims, 11 Drawing Sheets

CONNECTOR PROVIDED WITH A CAP FOR LOCKING TO A COMPLEMENTARY CONNECTOR AND WITH ONE OR MORE MEANS FOR SECURING THE LOCKING AND THE ASSOCIATED COUPLING BETWEEN CONNECTORS

TECHNICAL FIELD

The present invention relates to the field of electrical connectors.

The invention aims in particular to improve the mutual locking between two complementary connector casings, in particular multi-contact connector casings, when they are in a connected configuration.

Although described with reference to a favored application, aeronautics, and more particularly the field of equipment on board an aircraft, the invention may be implemented in any other application.

PRIOR ART

In many connection applications it is known to mutually lock a connector with the complementary one of the same assembly, once their connection configuration has been realized, i.e. the coupling between their respective contacts has been ensured.

This is particularly necessary when the environment of the connection assembly is subjected to significant environmental constraints, as may be the case in aircraft and in particular when the assembly is mounted on a panel of an item of equipment on board an aircraft.

A number of solutions have already been implemented as locking means.

First a screw-nut locking system is known, which is found for example in the connection assemblies sold by the Applicant under the designation EPX® B2: the receptacle bears a nut fastened to the casing in its central part between the two contact inserts, while the plug has a central hole through which a screw may be screwed into the nut so as to obtain the desired locking.

A quarter-turn fastening system is also known, which is found for example in the connection assemblies sold by the Applicant under the designation EPX® A, EPX® B1: the receptacle bears on either side of the central housing a male cylinder provided with two lugs protruding outward, and the plug bears a female cylinder with apertures facing each of the male cylinders.

FIG. 1 represents a plug 2 with its casing 20 as exists under the designation EPX® B1: fastening is ensured by means of a screwdriver, by quarter-turn screwing in the direction of the arrow R of the interface imprint 21 of each female cylinder 22 that makes it possible for the lugs to slide in the corresponding apertures 23 as far as one of their ends so as to obtain the desired locking. On the other hand, the generally successive actuation of these two quarter-turn imprints 21 risks causing misalignment. An operator may even lock the second one imperfectly without noticing. Furthermore, the implementation time is also longer.

Finally, it is widely known to implement a locking cap that is actuated by manual sliding on the casing of one of the connectors, the cap comprising shapes that cooperate with complementary shapes of the casing of the complementary connector so as to obtain the immobilization in translation of the cap and therefore the desired locking.

Thus, the patent EP1708313B1 therefore proposes a connection assembly comprising a locking cap between two multi-contact connectors, one of which is fastened to a support, the movement of the cap comprising locking teeth being carried out manually by sliding on the casing.

The patent EP2503651B1 also discloses a locking cap to be moved manually on the casing of one of the two multi-contact connectors, the other one being already mounted on an electronic equipment panel.

FIGS. 2A and 2B reproduce a connection assembly 1 with plug 2 and receptacle 3 that implements such a locking cap 4. This connection assembly 1 is mounted on a panel P that is for example that of a casing for an item of electronic equipment, in particular an item of equipment on board an aircraft or in a disconnect panel. More specifically, the receptacle 3 is mounted in an opening in the panel P to which the casing 30 of the receptacle 3 is fastened by means of screws 5.

The substantially U-shaped locking cap 4 is mounted so as to slide on the casing 20 of the plug 2 between its connection front face 24 and its rear face 25, perpendicular to its longitudinal axis X, i.e. along the longitudinal faces 26, 27. Each of the wings of the U internally comprises apertures/grooves 40 with suitable shapes. Each of the longitudinal faces 31 of the casing 30 of the receptacle 3 is provided with two lugs 32.

To carry out the locking as illustrated in FIG. 2B, an operator exerts, with their finger, a lateral thrust force T on the cap 4 from its distant extreme, unlocking position. The cap 4 is immobilized in its close-up extreme position, which is the locking position, by the wedging of each lug 32 of the casing 30 in an aperture 40 of the cap 4.

In order to have the possibility of easy locking in an environment constrained in terms of available space and/or that necessitates the application of a significant locking force, the Applicant has proposed, in the patent application EP3879639A1, a mechanism for transforming the rotational movement by a tool of an interface piece housed in the casing of a connector into a translational movement in a plane perpendicular to the coupling direction of a locking cap for locking the casing of the connector to that of a complementary connector. An example of such a mechanism, in particular with a cam, is shown in FIG. 2C: once the connection has been made between two complementary connectors 2, 3, an operator proceeds to the mutual locking thereof by causing the locking cap 4 to slide on the casing 30 of the connector 3 from its unlocking position to its locking position. To this end, they insert a hexagonal key H into the hexagonal imprint 51 of an interface piece 50 arranged on a lateral side of the casing 20 and effect a rotation of at least 180°. The operator is assured that the cap 4 is indeed in the locking position because on the one hand a lug 52 is in abutment against a relief 200 of the casing 20 and on the other hand a colored zone that is not shown is completely invisible to the operator because it is concealed, and finally they have felt the sudden reduction of the rotation torque to be applied.

Furthermore, in order to reduce the time for mounting the receptacle 3 in the opening O of a panel P or removing it therefrom, while at the same time dispensing with the need to use a tool, the Applicant has proposed, in the patent EP2654137B1, providing the receptacle with removable fastening means with hooks for fastening to the panel, at least one of which is connected to a tongue serving as bearing surface for a finger of an operator.

FIGS. 3 and 4 reproduce, respectively, an exemplary step of manually fastening such a connector receptacle in the opening O of a panel P, and the receptacle once fastened.

The multi-contact connector receptacle 3 comprises two hooking pieces 6 each having at least one hook 60 for fastening the casing, which are each mounted so as to slide on the casing 30, perpendicular to its axis X, between at least one retracted release position and at least one deployed fastening position.

The two hooking pieces 6 separate from one another when they each slide from their retracted position (FIG. 3) toward their deployed position (FIG. 4).

Each hooking piece 6 has a tongue 61 each serving as bearing surface for a finger of an operator (FIG. 3) and extending parallel to the axis X on the side of the rear face of the casing 30 and the rear face A of the panel P.

Two springs, distinct from the hooking pieces 6, not shown, are each mounted freely in a housing of the casing 30, on the one hand bearing against the latter and on the other hand bearing against a hooking piece 6. Each spring, which is preferably in the form of a helical compression spring, exerts a thrust force on the casing 30 perpendicular to the axis X of the casing, at least in a deployed position and in the absence of bearing on a corresponding tongue 61.

Furthermore, instead of fastening screws 5 shown in FIGS. 1 to 2B, the connector receptacle 3 can have, on each of its lateral ends, a protrusion 33 serving as surface for flat bearing against the rear face A of the panel P. A guiding stud 34 configured to cooperate with an opening of a panel P can protrude from one of the bearing surfaces 33. A male mating device 35, configured to cooperate with a female mating device of a plug complementary to the receptacle 1, can protrude from the other bearing surface 31.

The guiding stud 34 and the male mating device 35 do not necessarily serve as means for fastening the receptacle 1 but one and/or the other of the stud 34 and the mating device 35 can serve to realize a complementary fastening of the screw/nut type.

The steps for fastening such a connector receptacle 3 to the panel P from its rear face A are therefore the following.

An operator first of all positions the casing 30 facing the opening O in the panel P and simultaneously presses with a finger on each of the two tongues 61, thus bringing the two hooking pieces 6 closer to one another, as indicated by the two arrows oriented toward one another in FIG. 3.

Then the operator introduces the casing 30 in part into the opening O in the panel P while at the same time maintaining the pressure on the two tongues 61. If appropriate, the guiding stud 34 and the mating device 35 are used for guiding, each cooperating with an opening lateral to the opening O in the panel.

Once the casing 30 is housed in part in the opening O in the panel P with, if appropriate, its protuberances 33 bearing against the rear face A of the panel P, the operator releases the pressure on the two tongues 61.

The fastening hooks 60 then bear against the edge of the opening O in a deployed fastening position, this position being determined as a function of the thickness of the panel P and the dimensions of the opening O.

Thus, in this correct mounting position, the fastening hooks 60 hook the panel P, as it were. Now, in certain circumstances, in particular in the event of reduced accessibility to the zone where the connection is mounted or in the event of reduced flexibility of the harness (stiffness of the cables, clamping of the cables over a short distance), such mounting may be incorrect, in the sense that only one of the two fastening hooks 60 is really hooked onto the rear face A of the panel P, although visually this is not discernible by the operator.

Furthermore, this may prove to be unsatisfactory, as explained below with reference to FIGS. 5 to 7.

The connection between the plug 2 and the receptacle 3, which is therefore imperfectly coupled to the panel P, is also imperfect. In other words, the coupling between these two complementary connectors 2, 3 has not been carried out perfectly.

Incorrect coupling between the complementary connectors 2, 3 can also occur without the receptacle being incorrectly installed on the panel. Incorrect coupling can also result from the complementary connectors being brought insufficiently close to one another or from a connector 2 facing the connector 3 in a non-parallel manner and/or insufficiently inserted into the connector 3.

Furthermore, during this incomplete coupling phase, the wings of the U of the cap 4 have a tendency to separate from one another in their free end portion, i.e. the portion distant from the bottom of the U.

This separation can go so far as to move at least one of the locking lugs 32 out of the aperture/groove 40 in the cap 4 in which it was mounted so as to slide.

Furthermore, one or even both of the wings of the U of the cap 4 can also move out of their guiding along the longitudinal faces 26, 27 of the casing 20 of the plug 2. In particular, if the wings 42, 43 of the U of the cap 4 are provided with guiding ribs/tongues 44 designed to slide along guiding slideways 36 provided for this purpose respectively in the casing 30 of the receptacle 3, the tongues 44 on the side of the free end of the wings of the U of the cap 4 move out of the slideways 36.

Thus, ultimately, although in appearance the operator thinks that locking has been correctly carried out once they have caused the cap 4 to slide as far as its extreme position close up to the plug 2, i.e. although the visual security marker is no longer visible and/or the haptic stud is detectable to the touch, there is in fact imperfect coupling of the complementary connectors 2, 3 with the possibility of contacts that are not perfectly coupled with each other.

There is therefore a need to further improve the mutual locking between complementary connectors, in particular in order to overcome the aforementioned drawbacks and therefore to secure the locking and hence the connection, i.e. the prior mutual coupling between the connectors.

The invention aims to address all or part of this need.

DISCLOSURE OF THE INVENTION

To achieve this, one subject of the invention, according to one of the aspects thereof, is a connector, in particular a multi-contact connector, comprising:

- a casing of longitudinal axis (X), comprising a front face, called connection face, via which the connection to a connector of complementary type comprising a complementary casing is made, and a rear face,
- a cap for locking the connector to the complementary connector, said cap being mounted on the casing and designed to slide, transversely with respect to the longitudinal axis (X) of the casing, between an unlocking position and a locking position between casing and complementary casing,
- at least one means for securing the coupling and the locking, the one or more securing means being designed to mechanically block the sliding of the locking cap before it reaches its locking position, in the event of at least partial deformation of the cap that is caused by incorrect coupling.

According to an advantageous embodiment, the means for securing the coupling and the locking consisting of a means for mechanical interference between at least one deformed part of the cap and an element of the connector casing.

According to another advantageous variant embodiment, the locking cap is, in the non-deformed state, in section in a plane perpendicular to the axis X, substantially U-shaped, with a back and two parallel wings connected to the back and each designed to slide on one of the longitudinal faces of the casing from the locking position.

According to an advantageous embodiment, the casing has at least one relief of which the lateral edge forms the means for mechanical interference with the free end of one of the two wings and/or of a tongue and/or rib arranged at said free end.

According to this embodiment, the relief preferably comprises a guiding groove in which the guiding tongue arranged at the free end is designed to be inserted in the correct locking position.

Advantageously, at least one of the two wings comprises one or more guiding tongues designed to be inserted and slide in a guiding slideway provided on the casing and/or in a guiding slideway provided on the casing of the complementary connector.

According to an advantageous variant embodiment, the casing comprises a stud, the locking cap comprises a through-hole in which the stud of the casing is housed protruding from the cap in its locking position, forming a haptic locking indicator.

According to another advantageous variant embodiment, the connector comprises at least one visual indicator arranged so as to be visible to an operator in any position, from the unlocking position of the cap to its locking position in which it is concealed. The visual indicator is preferably a visible colored zone realized on the casing.

The connector can constitute a multi-contact connector, in which the casing houses at least one insert having cells that extend along the longitudinal axis (X) and that each house a contact.

According to an advantageous embodiment, the connector comprises a mechanism for transforming rotational movement into sliding of the locking cap, the mechanism comprising an interface piece that interfaces with a tool, the piece being mounted so as to be free to rotate in a housing of the casing and designed to be caused to rotate by the tool, along an angular travel that causes the locking cap to slide from its unlocking position to its locking position and vice versa.

The interface piece may comprise an interface imprint that interfaces with the tool, preferably a hollow hexagonal imprint.

According to an advantageous variant embodiment, the mechanism is a slide mechanism, in which:

- the interface piece comprises at its periphery a stud that protrudes toward the front face of the casing,
- the cap comprises a groove of complementary shape to that of the stud,
- the stud being mounted so as to slide in the groove, the shape of which is such that when the interface piece is caused to rotate by the tool over the angular travel, the stud sliding in the groove slides the cap from its unlocking position to its locking position and vice versa.

Another subject of the invention is an electrical connection assembly, comprising:

- a connector as described above, of plug type,
- a complementary connector, of receptacle type.

In other words, the invention consists essentially of a means that makes it possible to secure, preferably by mechanical interference, the fact that the locking cap effectively locks the casing of the connector to that of a complementary connector.

Another subject of the invention is a method for joining the connector and the complementary connector of the assembly as described above, the method involving the following steps:

- i/ making the connection by at least partial coupling of their front face between connector and complementary connector,
- ii/ causing the locking cap to slide in translation from its unlocking position toward its locking position,
- iii/—if the sliding of the cap according to step ii/ is blocked by the securing means, then reiterating steps i/and ii/;
- otherwise reaching the locking position in which the cap is immobilized with respect to the casing of the connector.

According to an advantageous embodiment, the method further comprises, once the locking position according to step iii/ has been reached, the following step:

- iv/ verifying the locking by means of the haptic and/or visible indicator.

The invention has numerous advantages with respect to the prior art, among which may be mentioned:

- detecting incorrect coupling of the connector with the complementary connector,
- reliably ensuring the correct coupling and locking between two complementary connectors, in particular of the multi-contact type,
- easy locking for operators,
- reliable monitoring by haptic and/or visual indicator allowing any operator to be assured of the correct coupling and locking between two complementary connectors.

The applications envisaged for the invention are numerous, among which may be mentioned the electrical connections within airplanes.

Other advantages and features of the invention will become more clearly apparent upon reading the detailed description of exemplary implementations of the invention, given by way of non-limiting illustration with reference to the following figures.

DETAILED DESCRIPTION

Figure 1:
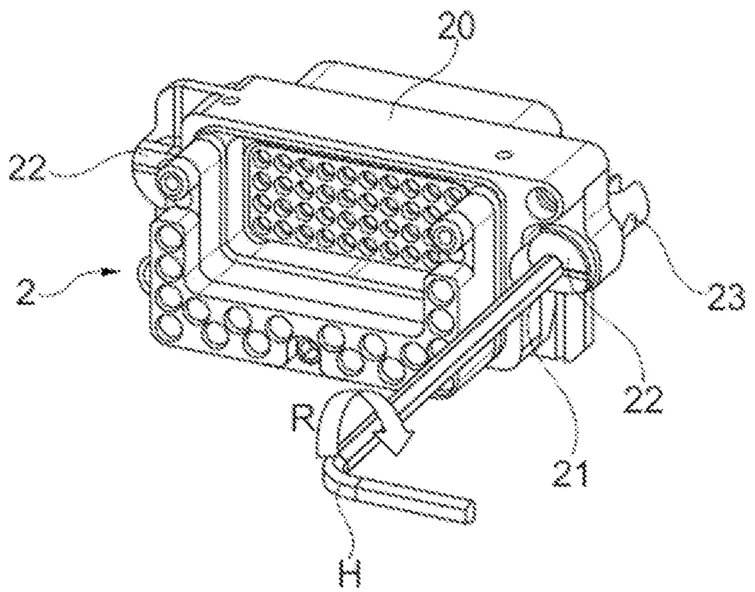
Fig. 1 (PRIOR ART)
FIG. 1 shows in a perspective view an exemplary quarter-turn locking system used for the mutual locking between two multi-contact connectors of an electrical connection assembly according to the prior art.
Figure 2A:
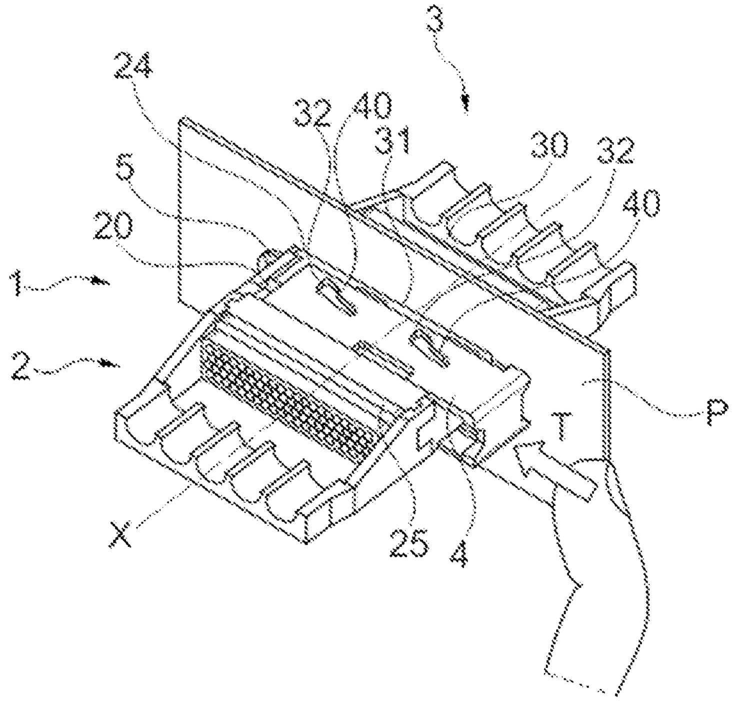
Fig. 2A (PRIOR ART)
FIG. 2A is a perspective view of an electrical connection assembly according to the prior art, with a cap for mutual locking of the multi-contact connectors in its unlocking position.
Figure 2B:
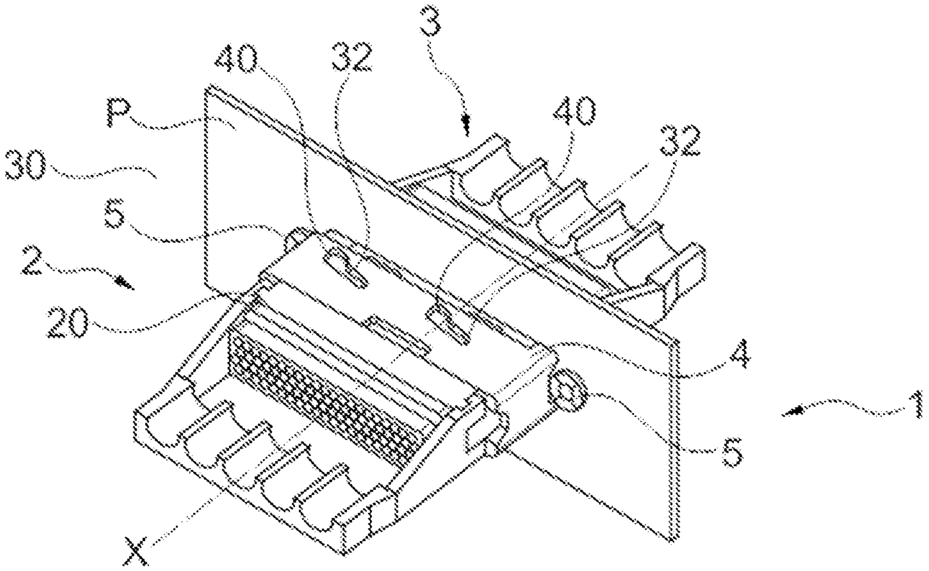
Fig. 2B (PRIOR ART)
FIG. 2B is a perspective view of an electrical connection assembly according to FIG. 2A but with the locking cap in its locking position.
Figure 2C:
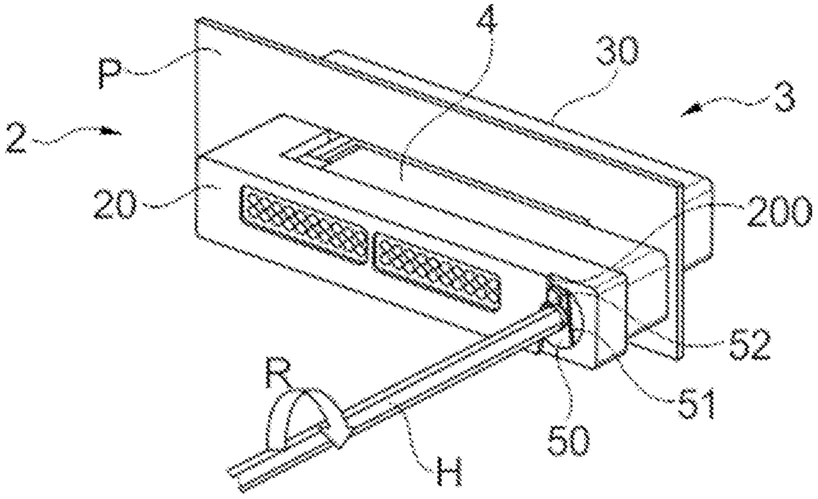
Fig. 2C (PRIOR ART)
FIG. 2C is a perspective view of another electrical connection assembly according to the prior art, with a locking cap actuated from its rear face by a mechanism for transforming the rotational movement into a translational movement by a tool.
Figure 3:
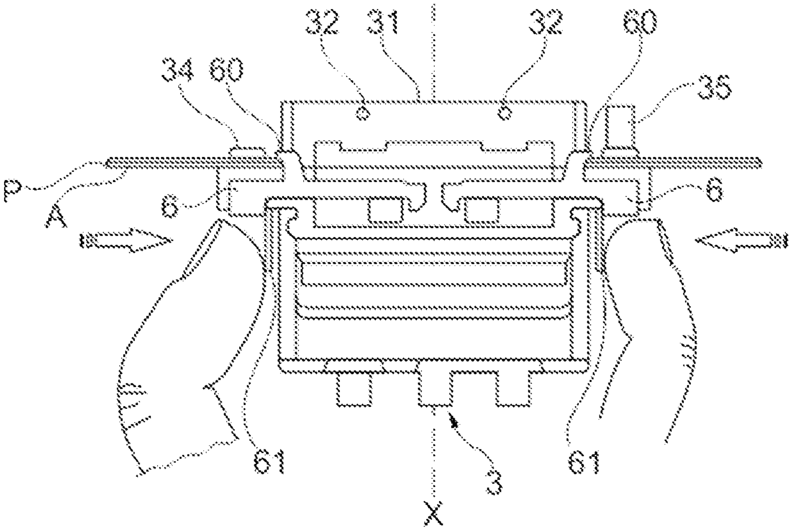
Fig. 3 (PRIOR ART)
FIG. 3 is a view in transverse cross section showing a step of a fastening a connector receptacle according to the prior art to a panel, FIG. 3 showing the pressing of two fingers of an operator for this fastening step.
Figure 4:
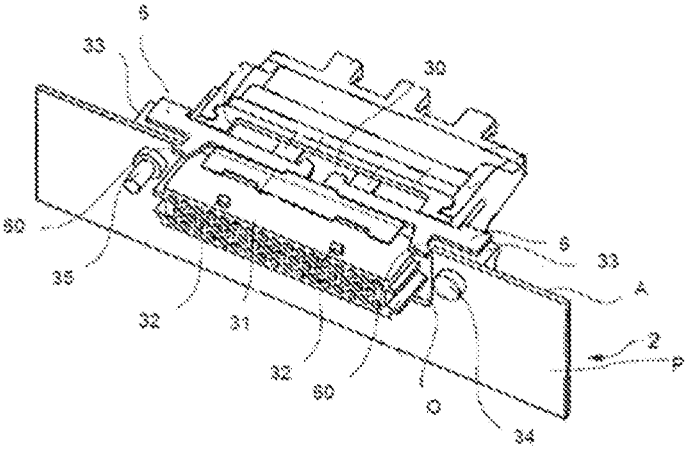
Fig.4 (PRIOR ART)
FIG. 4 is a perspective view in transverse cross section of the casing and of the receptacle fastened to the panel according to the prior art.

Throughout the present application, the terms “vertical”, “lower”, “upper”, “bottom”, “top”, “below” and “above” should be understood with reference to an electrical connector according to the invention with a casing and its locking cap in a horizontally arranged configuration.

Likewise, the terms “internal” and “external” should be understood with respect to the casing of the electrical connector according to the invention.

For the sake of clarity, one and the same reference numeral is used for one and the same element of an electrical connection assembly according to the prior art and of an electrical connection assembly according to the invention.

FIGS. 1 to 7 have already been described in detail in the preamble. They will therefore not be commented on below.

Figure 8:
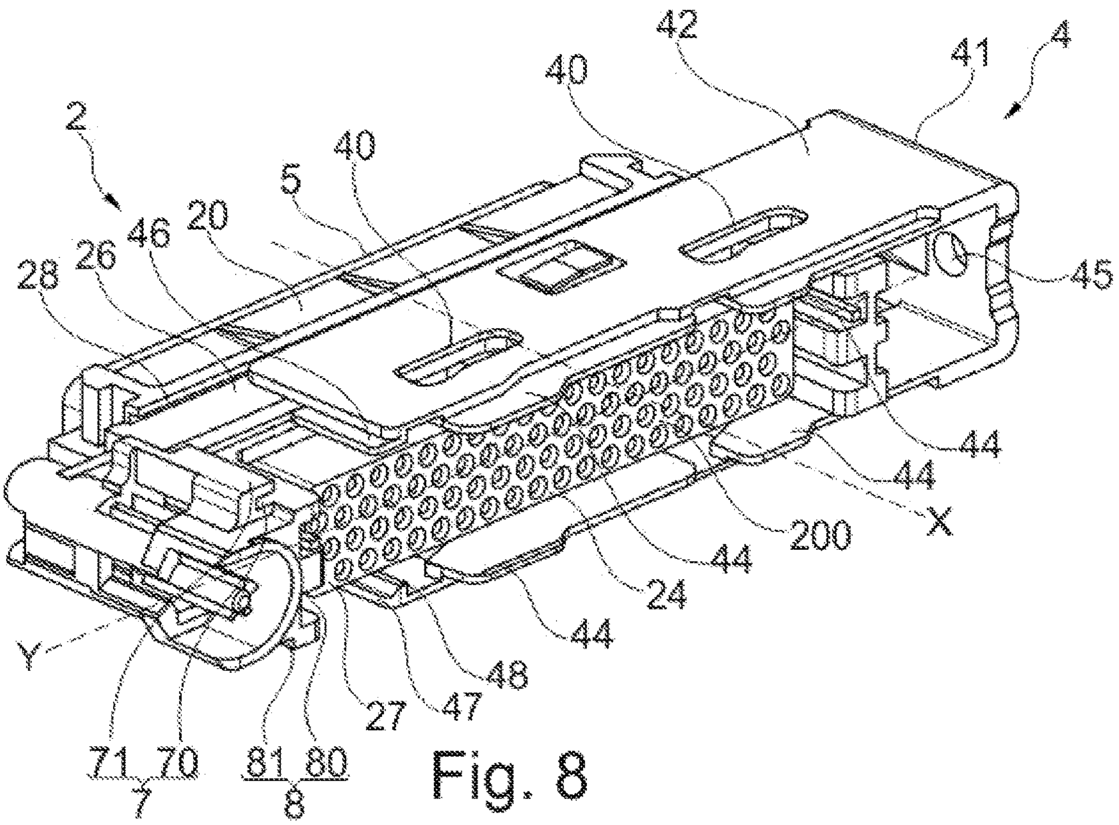
FIG. 8 is a perspective view of a connector forming a plug provided with a cap for locking to a complementary receptacle, according to the invention.

FIG. 8 shows an exemplary connector of plug type according to the invention, denoted overall by the reference 2.

The multi-contact connector 2 of male type, in particular a plug, is intended to be connected to a complementary connector 3 of female type, in particular a receptacle.

The connectors 2 and 3 are intended to house contacts that convey optical, radiofrequency or electrical signals, or power. The contacts may be of the same type. As a variant, signals or power of different types may be conveyed by the connectors 2, 3 and contacts of different size and type are then simultaneously implemented.

These contacts may be simple or multiple contacts, such as coaxial or triaxial contacts, quadrax contacts, RJ45 contacts, or any type of high throughput contact. These contacts (not shown) may also be optical contacts with lens-equipped contacts of “expanded beam” type or “physical contact” contacts of ARINC 801 or EN 4531 type, or else optoelectronic contacts.

The multi-contact connector 2 extends along a longitudinal axis X and comprises a casing 20 that is, in the example described, made in one piece from plastic material. The front face 24 and the rear face 25 of the casing 20 are parallel and extend perpendicular to the axis X.

An insert 5 with a plurality of cells is housed in the casing 20. Each cell is intended to house part of a contact that is not shown, of which another part that is housed in a cell 200 of the casing 20 protrudes beyond the front connection face 24 of the casing 20.

A locking cap 4 is mounted so as to slide on the casing 20, transverse to the longitudinal axis X for coupling the plug with the receptacle, i.e. along an axis Y perpendicular to the axis X, so as to mutually lock the connectors 2 and 3 when they are in the connected configuration, i.e. coupled to one another. The locking cap 4 can also assist with or finalize the coupling of the connector 2 onto the complementary connector 3, then mutually lock the connectors 2 and 3 once they are coupled.

The locking cap 4 of the connector 2 comprises, as visual locking indicator, a visible colored zone Z, i.e. one that is visible to an operator, from the unlocking position of the cap 4 to its locking position in which the zone Z is concealed by the casing 20, as detailed below.

As illustrated, the locking cap 4 is, in a plane perpendicular to the longitudinal axis (X), substantially U-shaped.

The cap 4 thus has a back 41 that faces a lateral face of the casing 20 and two parallel wings 42, 43 that respectively face a part of the upper longitudinal face 26 of the casing 2 and a part of the lower longitudinal face 27 of the casing 20. Thus, each wing 42, 43 of the U of the cap 4 is intended to slide along a longitudinal face 26, 27 of the casing 20.

Each of the wings 42, 43 of the U internally comprises apertures/grooves 40 with shapes that are designed to each cooperate with a lug 32 provided on one of the longitudinal faces 31 of the casing 30 of the receptacle 3, as explained below.

A wing 42, 43 may have on each of its longitudinal edges one or more guiding tongues/ribs 44 extending continuously or otherwise along an axis Y perpendicular to the axis X.

These guiding tongues 44 are designed to slide along guiding slideways 36 provided for this purpose respectively in the casing 30 of the receptacle 3.

The back 41 of the cap 4 has a through-hole 45 passing through it so as to let a stud 29 pass that protrudes from the lateral face of the casing 20, such that when the cap 4 is in its locking position, the stud 29 protrudes beyond the back 41 of the cap 4, thus forming a haptic finalized locking indicator, which is detectable blindly by an operator.

According to the invention, at least one of the longitudinal faces 26, 27 of the casing 20 comprises, on its lateral edge opposite the one facing the back 41 of the cap 4, a relief 7, 8 protruding relative to said face 26, 27.

Each relief 7, 8 has an L-shaped overall section of which the interior forms a locking groove 70, 80 and a lateral edge 71, 81 forming a mechanical interference means as explained below.

At least one wing 42, 43 of the cap 4 comprises, at its longitudinal end, a guiding tongue 46, 47.

In the example illustrated in FIGS. 8 to 10A, the guiding tongue 46 is in the form of an L-shaped tab projecting from the wing 42 toward the inside of the cap, while the guiding tongue 47 is made up of the very end of the wing 43, which may optionally be curved toward the inside. A rib 48 is arranged protruding and set back from the longitudinal end 47.

In the event of correct locking, each guiding tongue 46, 47 is housed in a groove 70, 80, at the end of sliding travel of the cap 4, in the locking position. In particular, the end 47 of the wing 43 is housed in the groove 80.

In the event of incorrect coupling, i.e. in the event of deformation/deflection of at least one of the wings 42, 43 of the cap 4 that separates it from the longitudinal face 26, 27 of the casing 4 on which it should slide, then the guiding tongue 46, 47, and if appropriate the rib 48, comes into abutment against the mechanical interference means 71, 81, preventing incorrect locking.

This deformation of one and/or the other of the wings 42, 43 can be caused previously by incorrect coupling of the connectors 2, 3 with each other, which is itself caused by incorrect initial fastening of the connector forming the receptacle 3 to a fastening panel, as detailed below.

Likewise, as described below, in addition to the mechanical interference realized by abutment between guiding tongues 46, 47 and mechanical interference means 71, 81, provision can be made that in the event of incorrect locking:

- the stud 29 does not protrude from the cap 4 and therefore the haptic indicator is not detectable by an operator, and/or
- the visible colored zone Z is visible and therefore the visual locking indicator is still visible to the operator.

There is now described with reference to FIGS. 9A to 9F the method of fastening, connecting and correctly locking a connection assembly with the two complementary connectors 2, 3 according to the invention to a panel.

Figure 5:
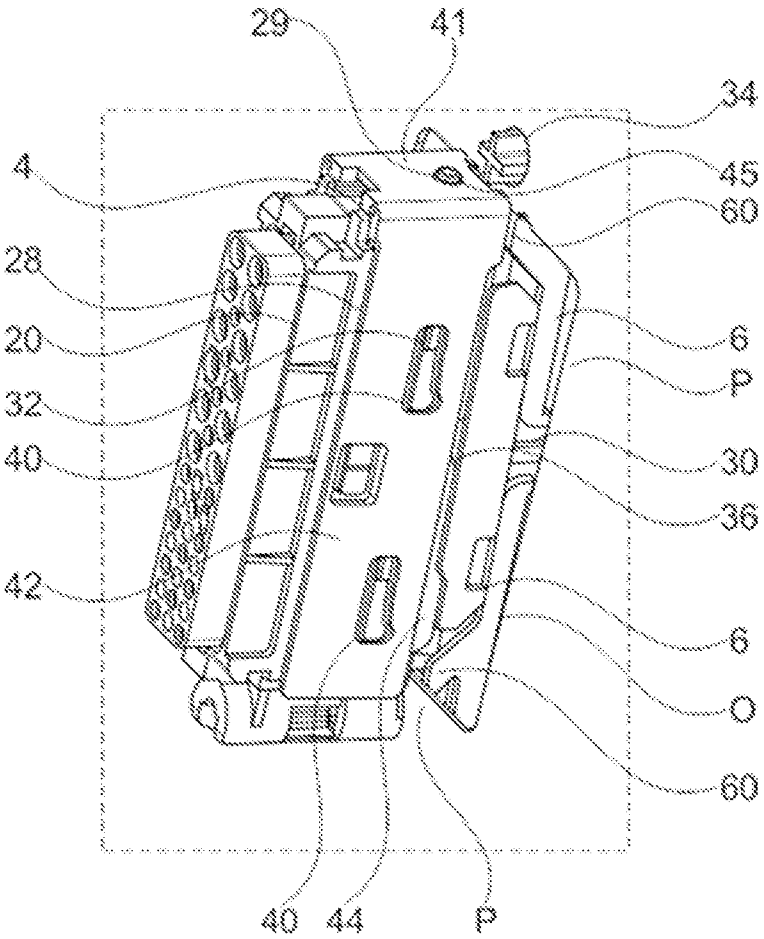
Fig. 5 (PRIOR ART)
FIG. 5 is a perspective view of a configuration of incorrect coupling and locking between complementary connectors according to the prior art.
Figure 5A:
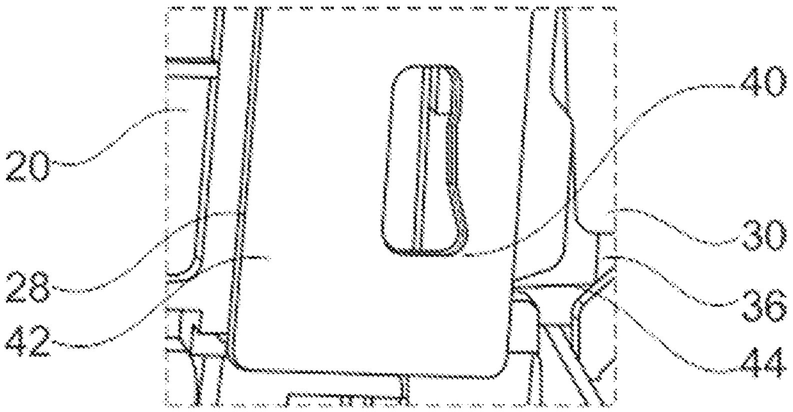
Fig. 5A (PRIOR ART)
FIG. 5A is a detail view of FIG. 5.
Figure 6:
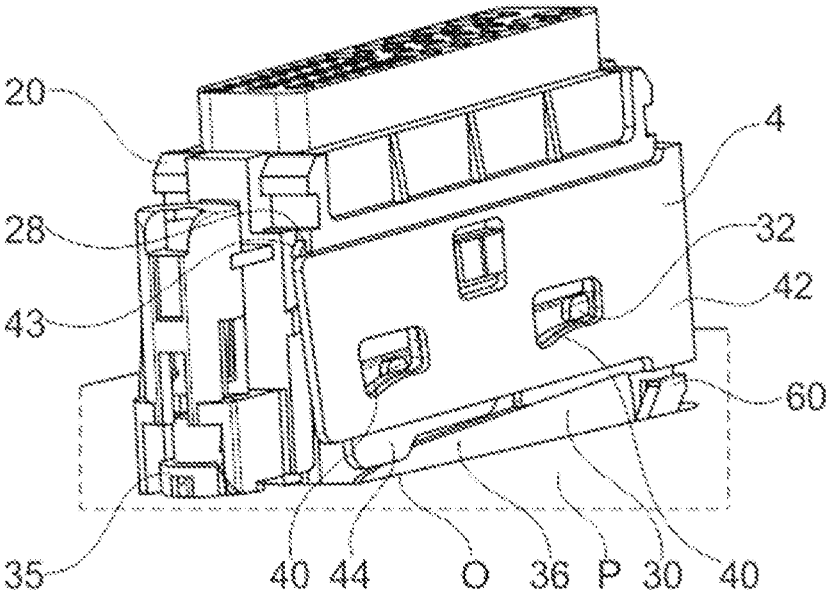
Fig. 6 (PRIOR ART)
FIG. 6 is another perspective view of the configuration in FIG. 5.
Figure 7:
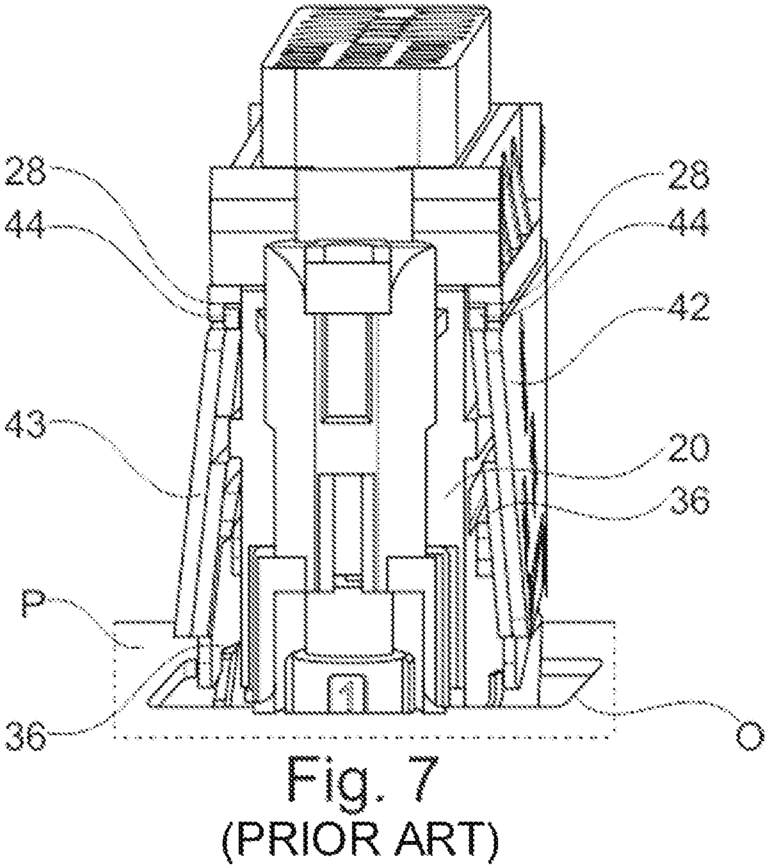
Fig. 7 (PRIOR ART)
FIG. 7 is a side view of the configuration in FIG. 5.

It is specified here that the panel is not shown per se, but that it corresponds to a panel like that of the prior art shown P with an opening O in FIG. 5 and that it is for example integrated into a casing of an item of electronic equipment, for example an item of equipment on board an aircraft or in a disconnect panel.

- Step 1/: the operator brings the receptacle 3 with its casing 30 in which is housed at least one insert 9 with cells for housing contacts toward the opening in the panel.
- Step 2/: the operator then inserts the receptacle 3 into the opening in the panel, centers it by means of the guiding studs 34 and the mating device 35, and then fastens it to the panel. To do this, the operator first of all positions the casing 30 facing the opening in the panel and simultaneously presses with a finger on each of the two tongues 61, thus bringing the two hooking pieces 6 closer to one another.

Then the operator introduces the casing 30 in part into the opening in the panel while at the same time maintaining the pressure on the two tongues 61. If appropriate, the guiding stud 34 and the mating device 35 are used for guiding/centering, each cooperating with an opening lateral to the opening in the panel.

Once the casing 30 is housed in part in the opening in the panel with, if appropriate, its protuberances 33 bearing against the rear face of the panel, the operator releases the pressure on the two tongues 61.

The fastening hooks 60 then bear against the edge of the opening in a deployed fastening position, this position being determined as a function of the thickness of the panel P and the dimensions of the opening.

Thus, in this correct mounting position, the fastening hooks 60 hook the panel, as it were.

Figure 9A:
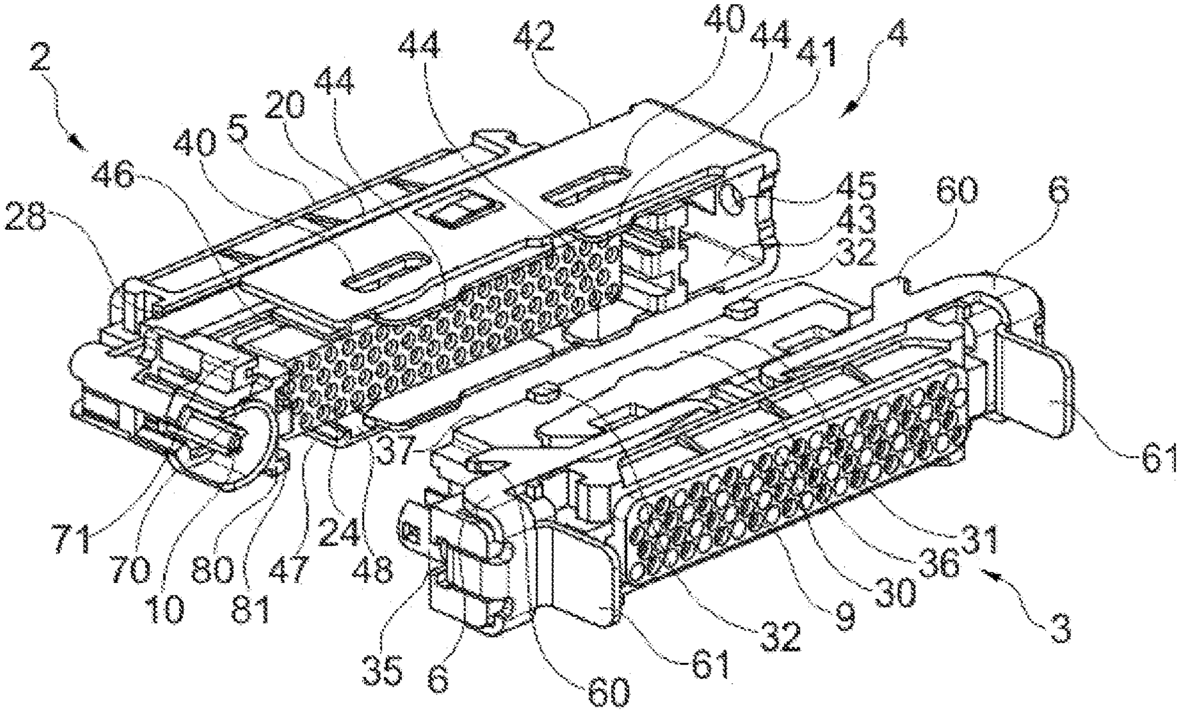
FIGS. 9A to 9F illustrate various steps of connection and correct locking between complementary connectors according to the invention.
Figure 9B:
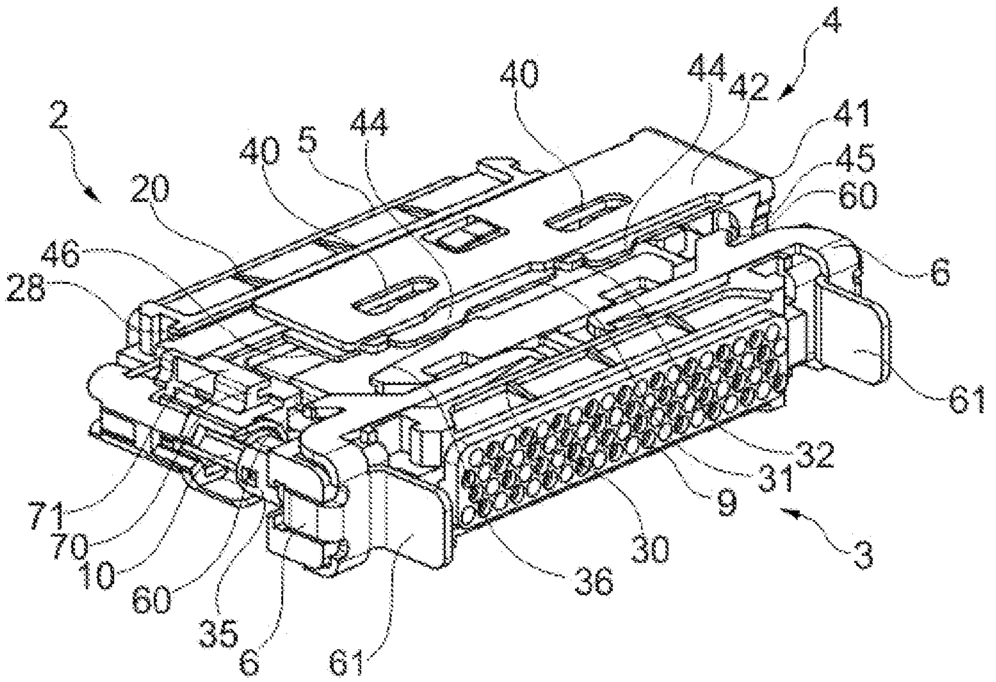
Figure 9C:
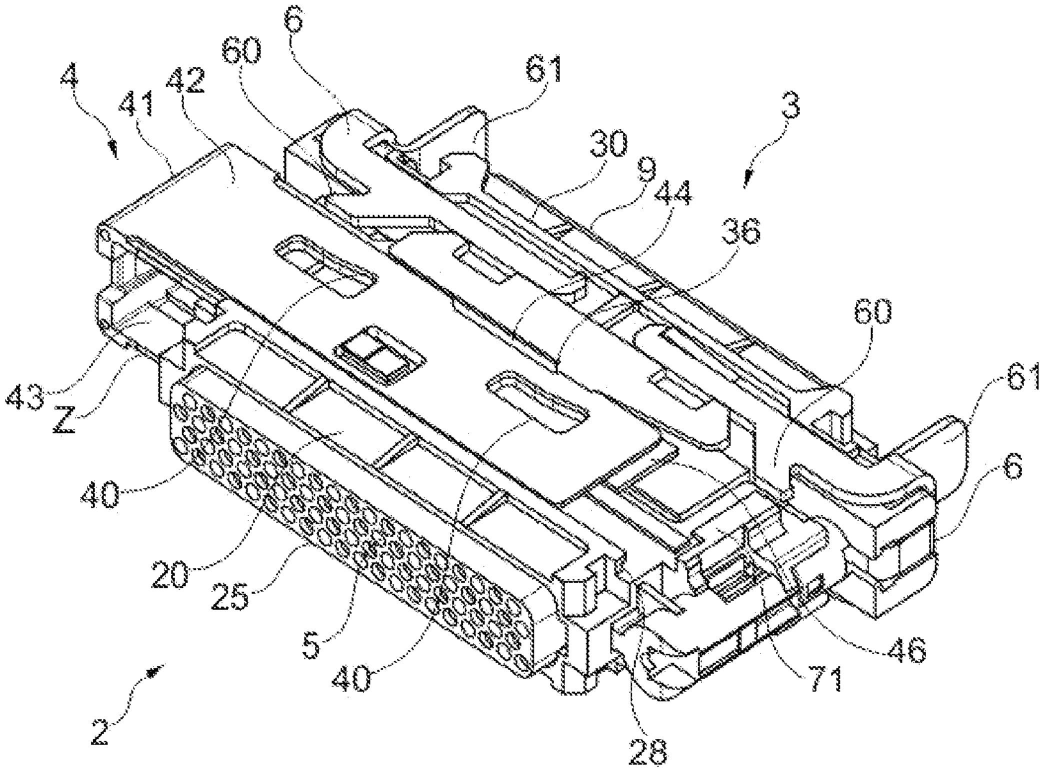
Figure 9D:
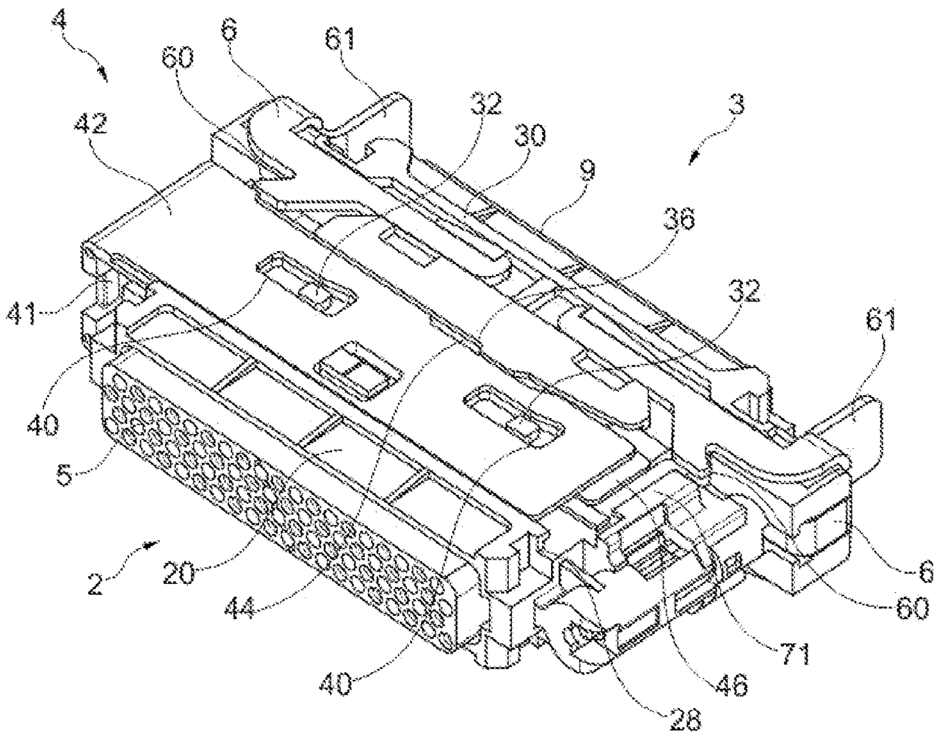
Figure 9E:
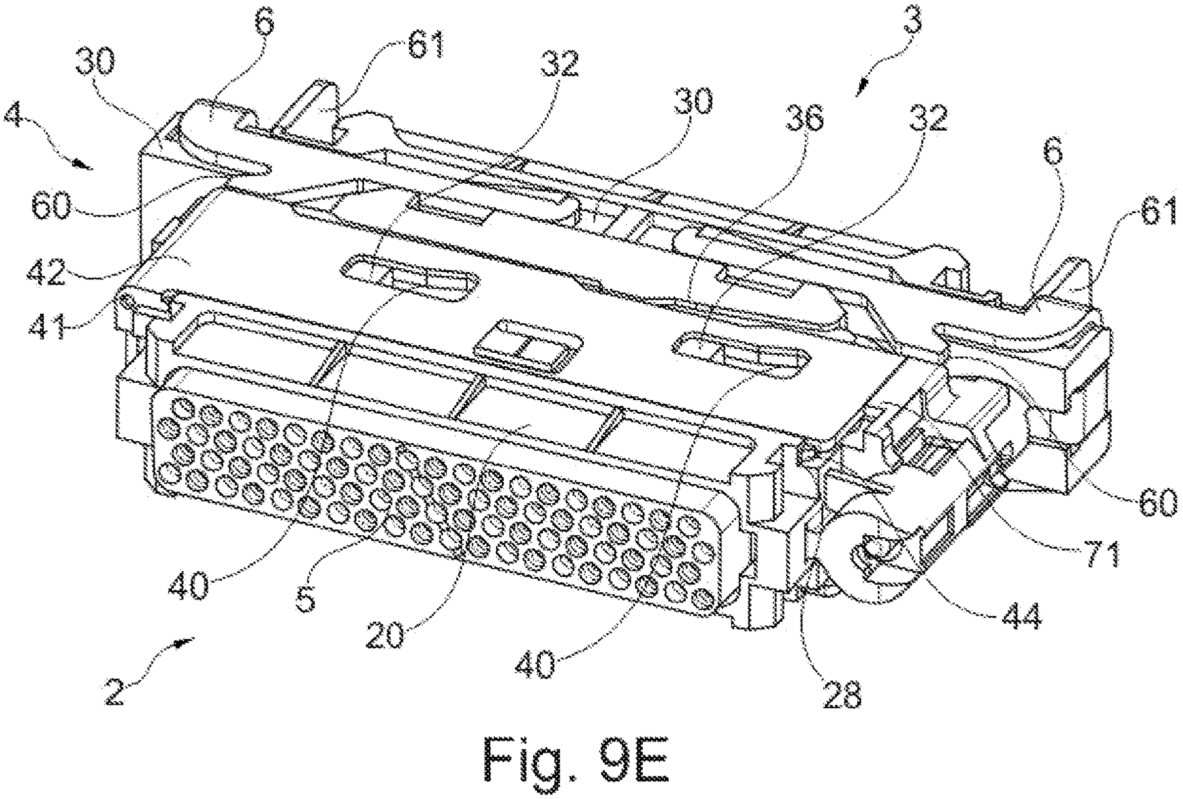
Figure 9F:
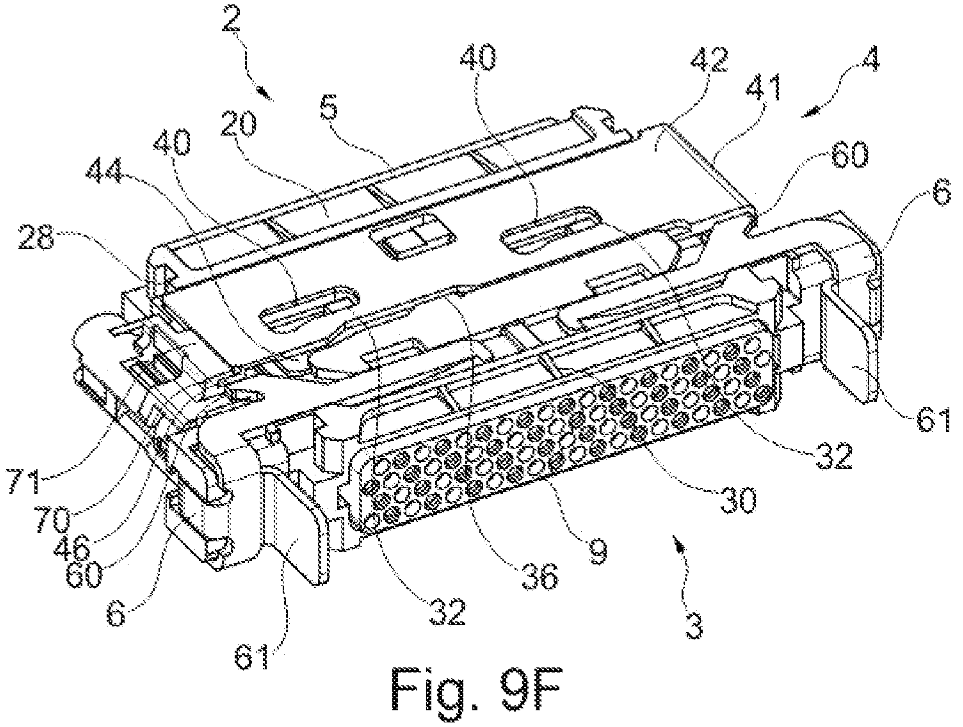

- Step 3/: the operator then grasps the plug type connector 2 with its locking cap 4 in its unlocking position.
- Step 4/: the operator then brings the plug 2, with its contacts inserted and fastened in the insert 5 housed in the casing 20, to face the receptacle 3 in such a manner as to mutually couple them, at least partially, via their front face 24, 37 so as to make the connection (FIG. 9A).
- Step e/: once mutual coupling has been, at least partially, carried out, the operator can then proceed to the mutual locking thereof by causing the locking cap 4 to slide on the casing 3 from its unlocking position (FIGS. 9B to 9D) to its locking position (FIGS. 9E and 9F).

Thus, the operator exerts either, with their finger, a lateral thrust force on the back 41 of the cap 4 from its distant extreme, unlocking position, or, with a tool, a rotation transformed by a mechanism into a translational movement of the cap 4 from its distant extreme unlocking position. This can be a mechanism with a cam as described in the patent application EP3879639A1.

During the sliding of the cap 4, the guiding tongues 44 slide in slideways 28, 36 respectively of the casing 20 of the plug 2 and of the casing 30 of the receptacle 3.

The cap 4 is immobilized in its close-up extreme position, which is the locking position, by the wedging of each lug 32 of the casing 30 in an aperture 40 of the cap 4.

In this correct locking position, the guiding tongues 46, 47 are inserted into the grooves 71, 81 respectively of the casing 20 of the plug 2.

The operator is assured that the cap 4 is indeed in the locking position and that this and the prior coupling between connectors 2, 3 are correct because on the one hand the stud 29 housed in the hole 45 protrudes beyond the cap 4 and on the other hand the colored zone Z is completely invisible to the operator because it is concealed. In other words, the haptic indicator and the visual indicator can be detected by the operator.

Figure 10:
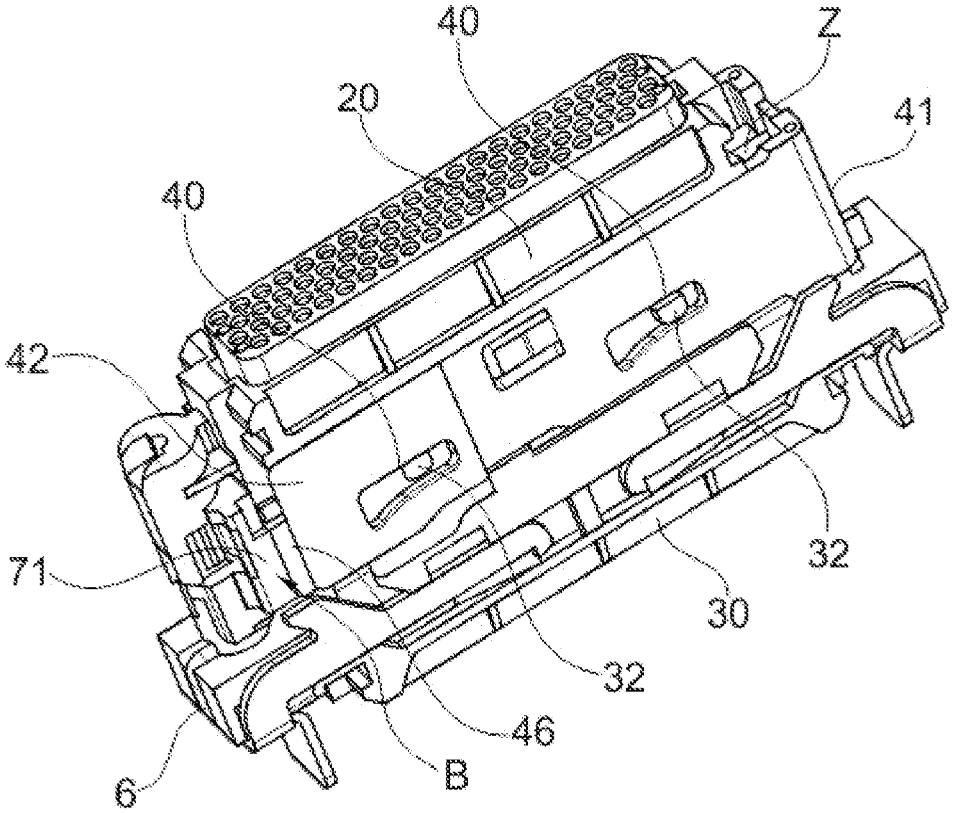
FIGS. 10 and 10A illustrate a configuration for detecting incorrect locking with complementary connectors according to the invention.
Figure 10A:
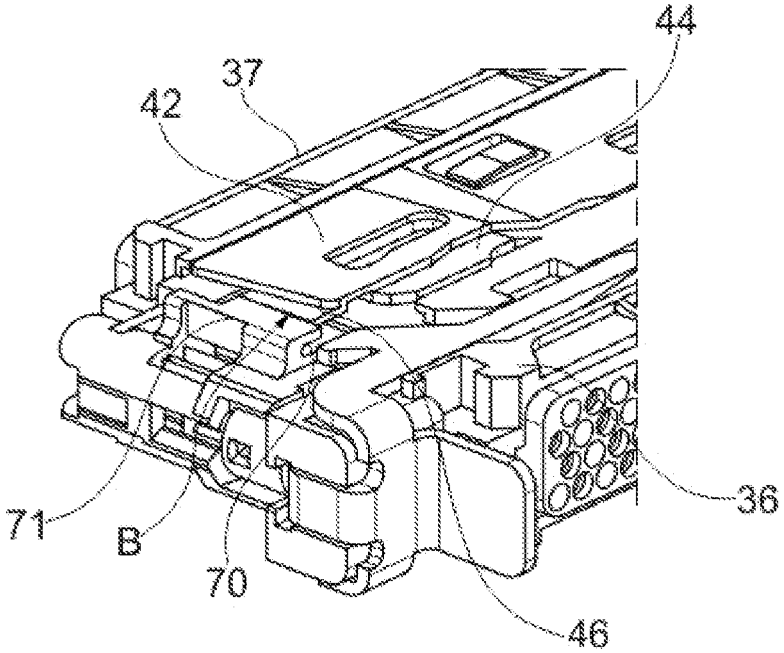

FIGS. 10 and 10A show a configuration of incorrect locking between connectors 2, 3 described above, following incorrect coupling between them.

In this configuration, at least one of the two wings of the cap 4, the one referenced 42 in the example illustrated, is deflected and therefore is separated from the longitudinal face 26 of the casing 20 to the point that, on the one hand, at least one of the guiding tongues 44 is moved out of the slideway 36 and, on the other hand, the stud 32 is moved out of the aperture 40 in the cap 4.

This deflection causes the abutment B of the guiding tongue 46 against the mechanical interference means formed by the edge 71 provided for this purpose.

Furthermore, the stud 29 cannot protrude beyond the cap 4 and therefore the haptic indicator that it forms cannot be detected by the operator.

Finally, the colored zone Z remains visible to the operator.

Thus, the operator is informed by one and/or the other of the haptic and visual indicators that the locking and therefore the coupling between the two connectors 2, 3 has not been correctly carried out.

Figure 11:
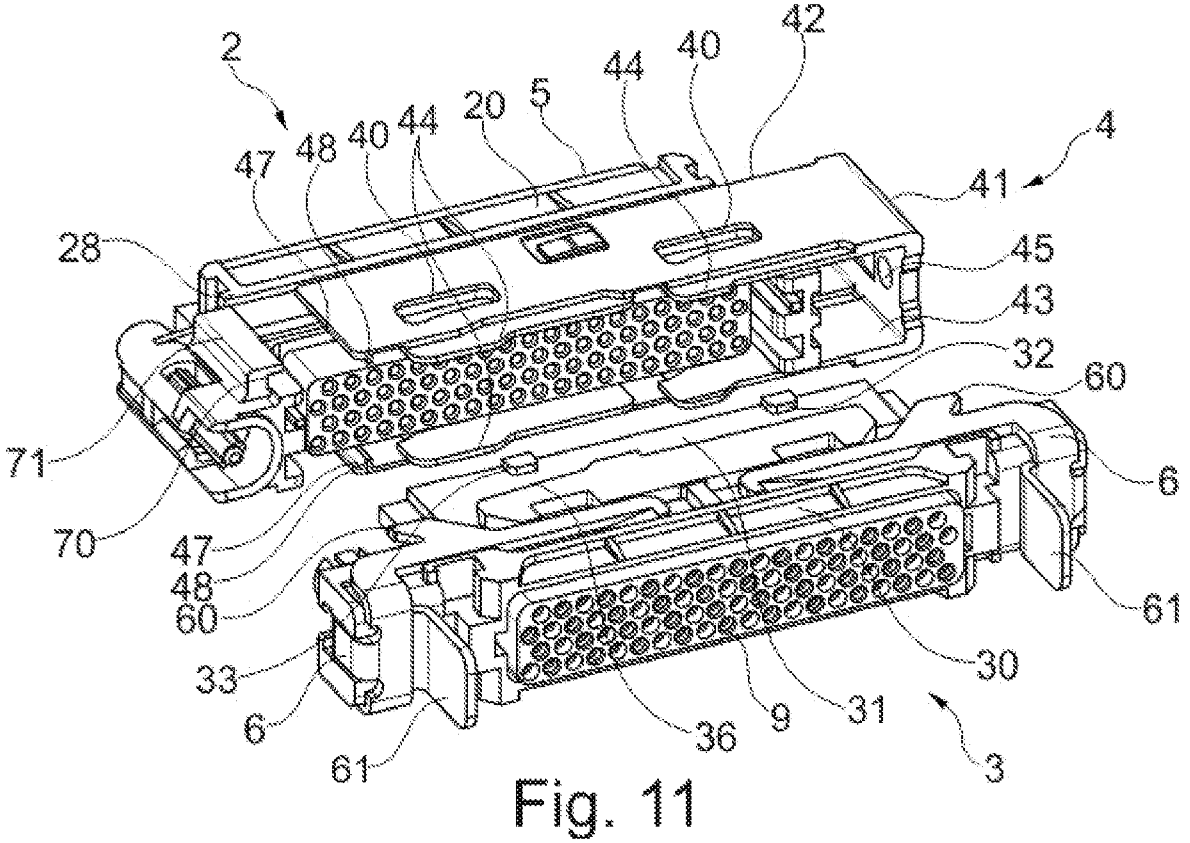
FIG. 11 is a perspective view of a connector forming a plug provided with a cap for locking to a complementary receptacle, according to a variant embodiment of the invention.

FIG. 11 illustrates a variant according to which, for each of the two wings 42, 43, the guiding tongue 47 is made up of the very end of the wing 42, 43, which may optionally be curved toward the inside. A rib 48 is arranged protruding and set back from the longitudinal end 47 for each wing 42, 43.

Figure 12:
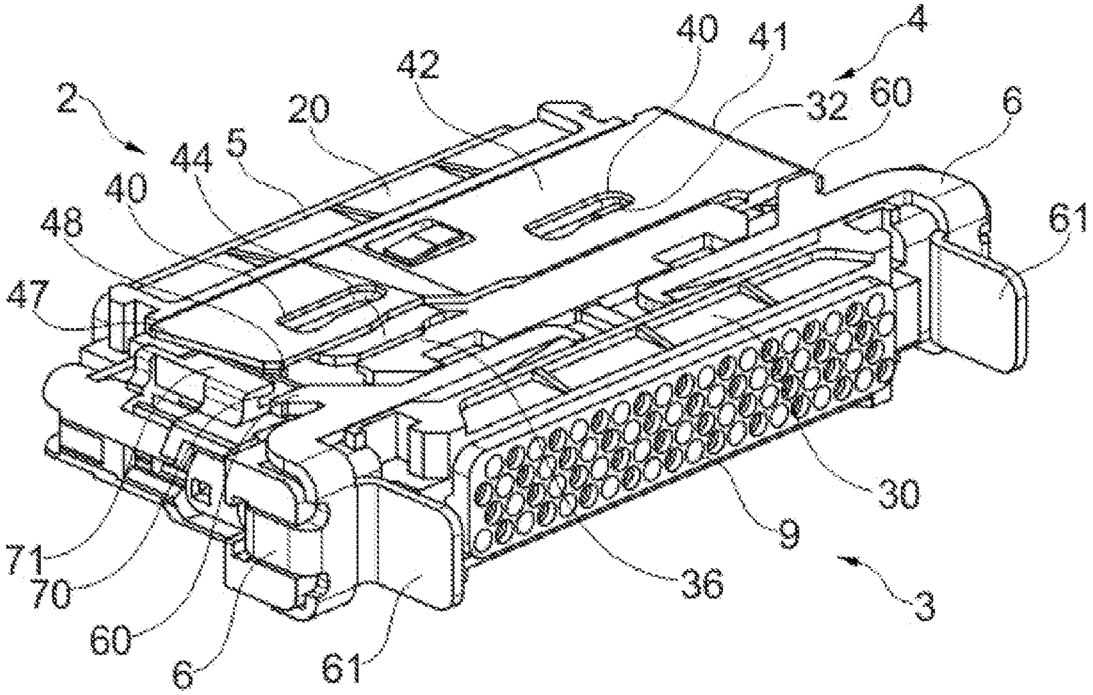
FIGS. 12 and 12A illustrate a configuration for detecting incorrect locking with the variant according to FIG. 11.
Figure 12A:
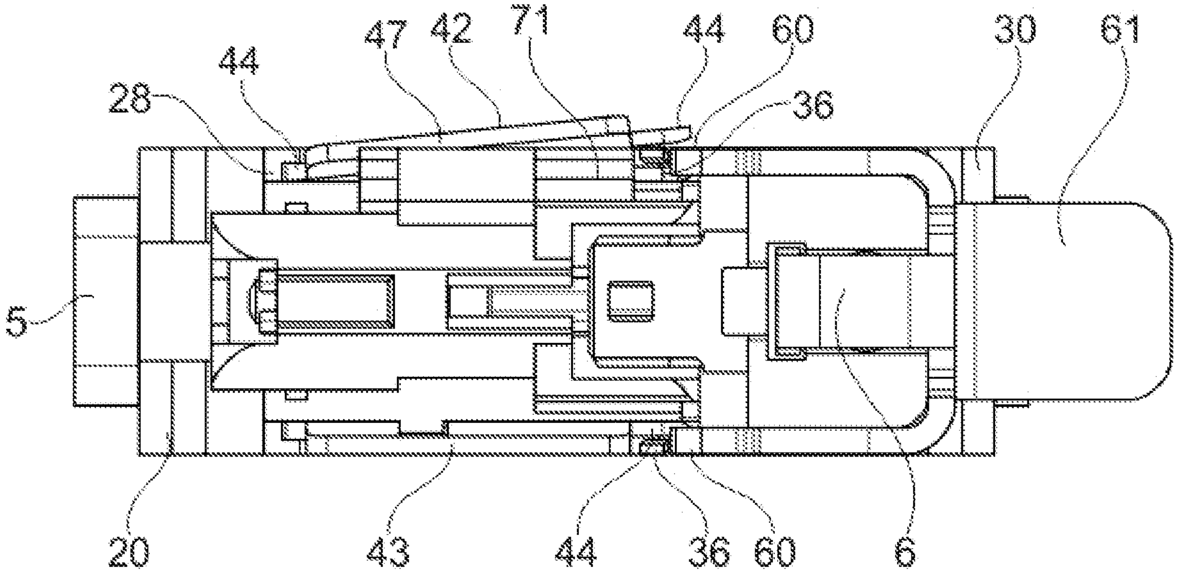

FIGS. 12 and 12A illustrate a configuration of incorrect locking between connectors 2, 3 with the cap 4 according to the variant in FIG. 11, following incorrect coupling between them.

Here again, the wing 42 of the cap 4 is deflected and therefore is separated from the longitudinal face 26 of the casing 20 to the point that, on the one hand, at least one of the guiding tongues 44 is moved out of the slideway 36 and, on the other hand, the stud 32 is moved out of the aperture 40 in the cap 4.

This deflection causes the abutment of the guiding tongue 47 and/or of the rib 48 against the mechanical interference means formed by the edge 71 provided for this purpose. If appropriate, the guiding tongue 47 can for its part move outside the edge 71.

Here likewise, the stud 29 cannot protrude beyond the cap 4 and the colored zone Z is visible to the operator. The haptic and visual indicators therefore also indicate to the operator that the locking and therefore the coupling between the two connectors 2, 3 has not been correctly carried out.

Other variants and improvements may be provided without however departing from the scope of the invention.

For example, there may be provided as mechanical interference means a single stop 70/71 for detecting incorrect coupling on one face of the casing 20. It is also possible to envisage it on the opposite face or on both opposite faces.

The expression "having a" should be understood as being synonymous with "having at least one", except when the contrary is specified.

The invention claimed is:

1. A connector) comprising:

a casing of longitudinal axis (X), comprising a front face, called connection face, via which the connection by coupling along the longitudinal axis (X) to a connector of complementary type comprising a complementary casing, is made, and a rear face, a cap for locking the connector to the complementary connector, said cap being mounted on the casing and designed to slide, transversely with respect to the longitudinal axis (X) of the casing, between an unlocking position and a locking position between casing and complementary casing, at least one means for securing the coupling and the locking, the one or more securing means being designed to mechanically block the sliding of the locking cap before it reaches its locking position, in the event of at least partial deformation of the cap that is caused by incorrect coupling.

2. The connector according to claim 1, wherein the means for securing the coupling and the locking consist of a means for mechanical interference between at least one deformed part of the cap and an element of the connector casing.

3. The connector according to claim 1, wherein the locking cap is, in the non-deformed state, in section in a plane perpendicular to the axis X, substantially U-shaped, with a back and two parallel wings connected to the back and each designed to slide on one of the longitudinal faces of the casing from the locking position.

4. The connector according to claim 3, wherein the casing having at least one relief of which the lateral edge forms the means for mechanical interference with the free end of one of the two wings and/or of a tongue and/or rib arranged at said free end.

5. The connector according to claim 4, wherein the relief comprises a guiding groove in which the guiding tongue arranged at the free end is designed to be inserted in the correct locking position.

6. The connector according to claim 3, wherein at least one of the two wings comprises one or more guiding tongues designed to be inserted and slide in a guiding slideway provided on the casing and/or in a guiding slideway provided on the casing of the complementary connector.

7. The connector according to claim 1, wherein the casing comprises a stud, the locking cap comprising a through-hole in which the stud of the casing is housed protruding from the cap in its locking position, forming a haptic locking indicator.

8. The connector according to claim 1, comprising at least one visual indicator arranged so as to be visible to an operator in any position, from the unlocking position of the cap to its locking position in which it is concealed.

9. The connector according to claim 8, wherein the visual indicator is a visible colored zone realized on the cap.

10. The connector according to claim 1, comprising a mechanism for transforming rotational movement into sliding of the locking cap, the mechanism comprising an interface piece that interfaces with a tool (H), the piece being mounted so as to be free to rotate in a housing of the casing and designed to be caused to rotate by the tool, along an angular travel that causes the locking cap to slide from its unlocking position to its locking position and vice versa.

11. The connector according to claim 1, being a multi-contact connector.

12. An electrical connection assembly, comprising:

a connector according to claim 1, of plug type, a complementary connector, of receptacle type.

13. A method for joining the connector and the complementary connector of the assembly according to claim 12, the method comprising the following steps:

i/ making the connection by at least partial coupling of their front face between connector and complementary connector, ii/ causing the locking cap to slide in translation from its unlocking position toward its locking position, iii/—if the sliding of the cap according to step ii/ is blocked by the securing means, then reiterating steps i/ and ii/;

otherwise reaching the locking position in which the cap is immobilized with respect to the casing of the connector.

14. The method according to claim 13, wherein the casing comprises a stud, the locking cap comprising a through-hole in which the stud of the casing is housed protruding from the cap in its locking position, forming a haptic locking indicator, the method further comprising, once the locking position according to step iii/ has been reached, the following step:

iv/ verifying the locking by means of the haptic indicator and/or a visible indicator.

* * * * *